Patented Aug. 23, 1932

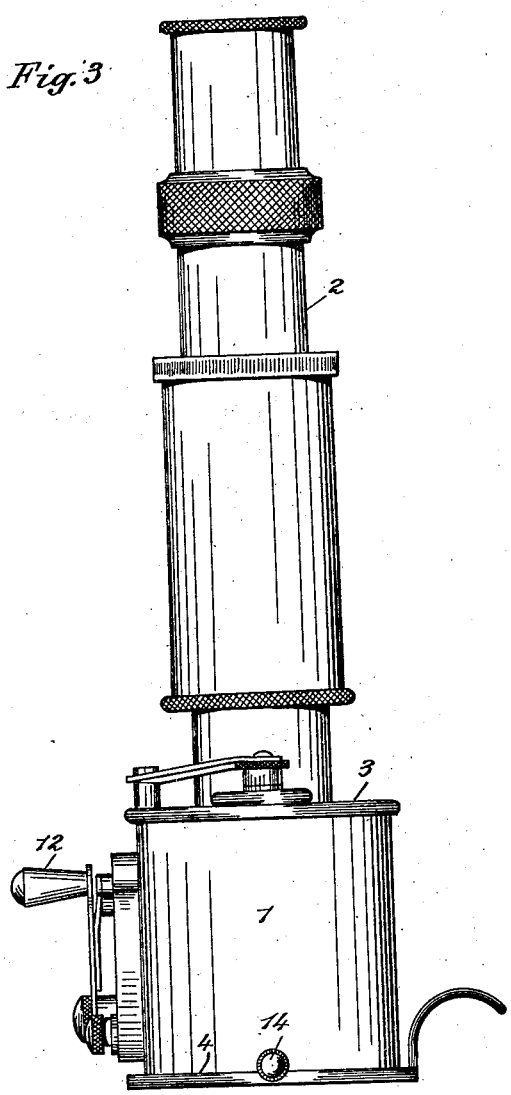

1,873,149

UNITED STATES PATENT OFFICE

FERNANDO PEREZ, OF ROME, ITALY

MICROSCOPE FOR EXAMINING PICTURES WITH RASANT LATERAL LIGHTING

Application filed January 9, 1931, Serial No. 507,683, and in Italy April 19, 1930.

Up to now the means for examining the surface of pictures, and most particularly valuable oil pictures, were rather insufficient as only ordinary microscopes were used therefor, which involve moving the pictures from one place to another. Also magnifying glasses were used, but found insufficient for the purpose, besides which the picture was exposed to ordinary diffused or insufficient light and did not show any uneven or projecting details of the picture, so that no thorough examination of pictures such as for unevennesses was hitherto possible.

For obtaining this purpose there can be used no ordinary magnifying devices or strong lighting devices, such as microscopes which throw diffused light on the object under examination, but in order to put in evidence all projecting or uneven particles of the picture surface the latter is to be exposed to the light in a strongly inclined, almost rasant direction.

The microscope according to invention permits of a thoroughly exact examination under magnifying variable according to necessities. It permits of lateral lighting from the right or left or both sides with inclination varying up to rasant angle.

By alternately varying the lightings all unevennesses projecting from the picture surface are exactly ascertained, which is very important, nay indispensable when it is desired to safely restore, touch up or renovate artistically valuable pictures, or learn the special technics of the masters.

Two modifications of my invention are shown in the annexed drawings, in which

Figure 1:
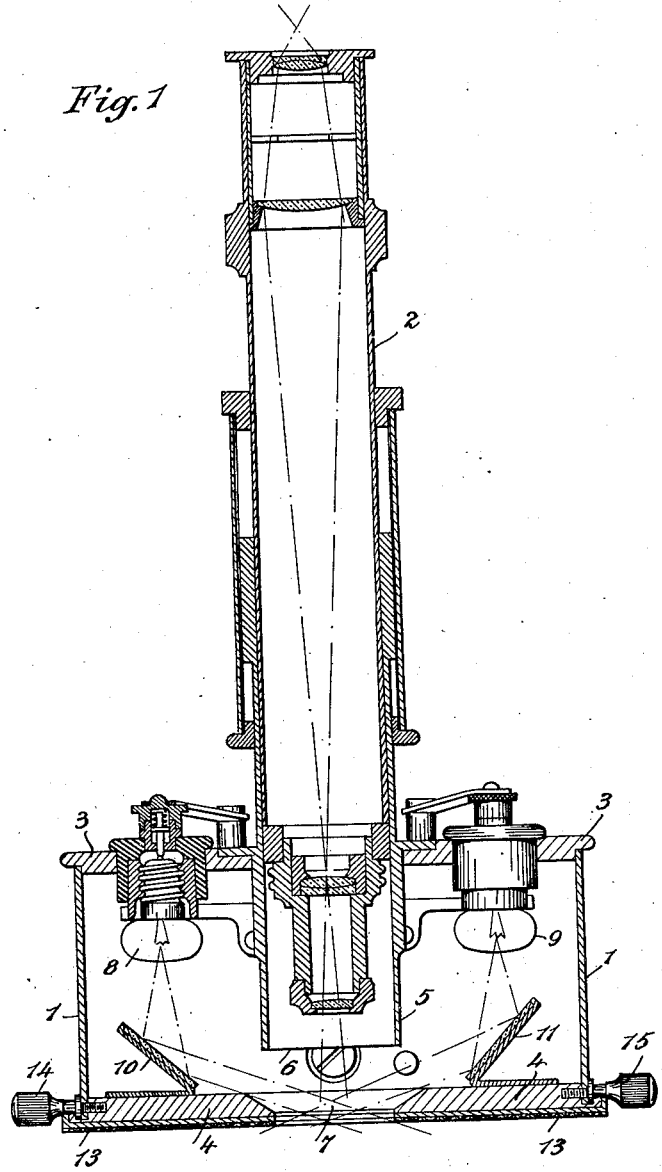
Figure 2:
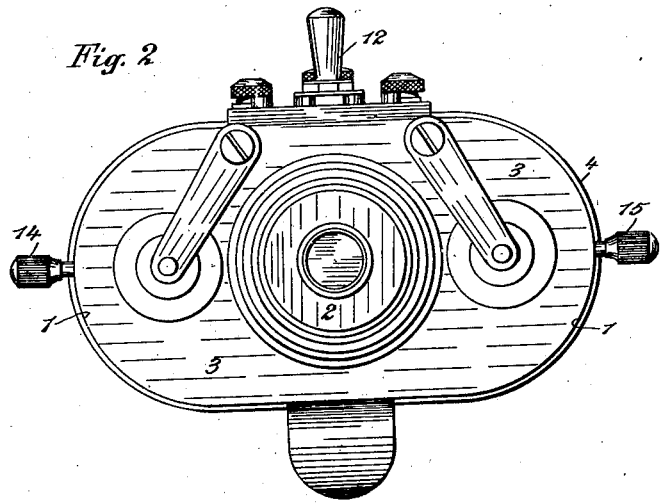
Figure 4:
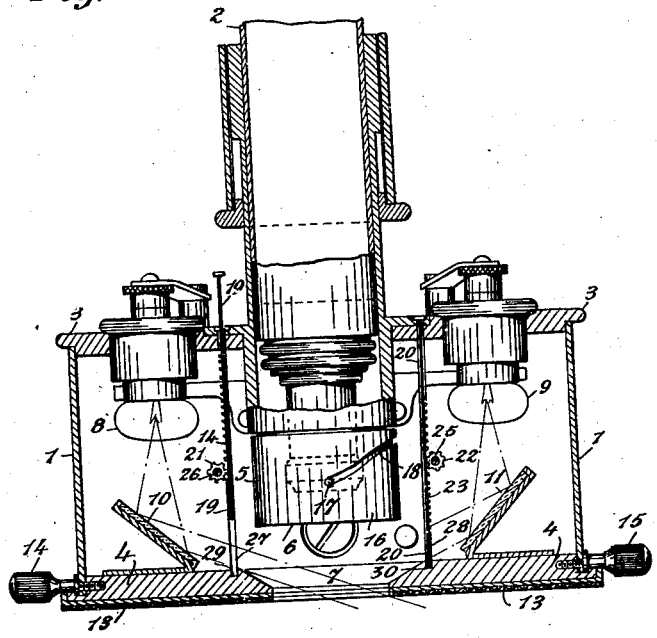

Fig. 1 is a vertical section of apparatus,
Fig. 2 a plan view,
Fig. 3 a side view, and
Fig. 4 a partial elevation of Fig. 1 in a modification.

The microscope comprises a casing 1 containing the lighting device, and a tube 2 with the lenticular system.

Both the upper face 3 and the lower face 4 of case 1 have a central opening. Through the upper opening passes the optical tube with its cylindrical lining 5 forming a partition wall between the lighting device and the lens system. Between the lower end 6 of the lining and the central opening 7 of bottom 4 an empty space is therefor formed for the passage of the light beams obliquely directed towards the lower central opening 7 of bottom 4.

In the empty space between the central lining and the lateral walls of the case or standard 1 the lighting device is placed comprising two electric lamps 8, 9 contacting with the upper surface, and two oblique reflectors or mirrors 10, 11 fixed to the bottom 4. The light beams from the lamps are reflected to the mirrors 10, 11, and the beams which are not intercepted by the lining run to the central opening 7 of the standard bottom 4 placed over the object under examination.

The lamps may be lit by any suitable source of electric energy through a switch 12 adjustable on three contacts. One contact serves for the right lamp 9, another for the left lamp 8 and the third for simultaneously lighting both lamps. Thus flat or rasant light beams running from the right or left, or from both the right and left are obtained at the same time.

Between the bottom or standard 4 and the object to be examined a small velvet covered projective plate 13 with a central opening may be inserted.

The lower surface of the casing may be removed by loosening screws 14, 15.

As shown in Fig. 4 the lining 5 may be shiftable so as to be able to adjust according to need the height of the small space traversed by the rasant beams, by means of an outer ring 16 gliding in a helical groove 18 of the ring on a pin 17 integral with the lining 5.

In order to partially or totally intercept the oblique beams running from the right or from the left or both from right and left two sliding or sluice-like shutters 19 and 20 are provided in casing 1. The shutters have teeth 23, 24 meshing with gears 21, 22 by which they are operated. Gears 21, 22 are integral with their axes 25, 26 respectively, keyed at one end to the inner surface of one of the sides of casing 1 whilst the lower end passes through the other side of the casing and terminates in a milled control knob.

In order to exclude the light from the interior of the apparatus both shutters glide in side grooves 27, 28 and at the bottom engage grooves 29, 30 of the upper surface of standard 4.

The upper outer surface of the shutters are graduated for being able to control their heights.

Having now particularly described and ascertained the nature of my said invention and in what manner the same is to be performed I declare that what I claim is:

A microscope comprising a lens tube having an objective end, a casing surrounding the objective end of the tube and provided with an opening towards the object, sources of light located in said casing illuminating an object from different sides by oblique incident light, slide-like shutters between the individual source of light and the surface of the object to be illuminated, said slide-like shutters being separately adjustable whereby the passage available for each oblique illuminating beam of light may be regulated or entirely closed independently of the other beams of light.

In testimony whereof I have hereunto signed my name.

FERNANDO PEREZ.